UNITED STATES PATENT OFFICE.

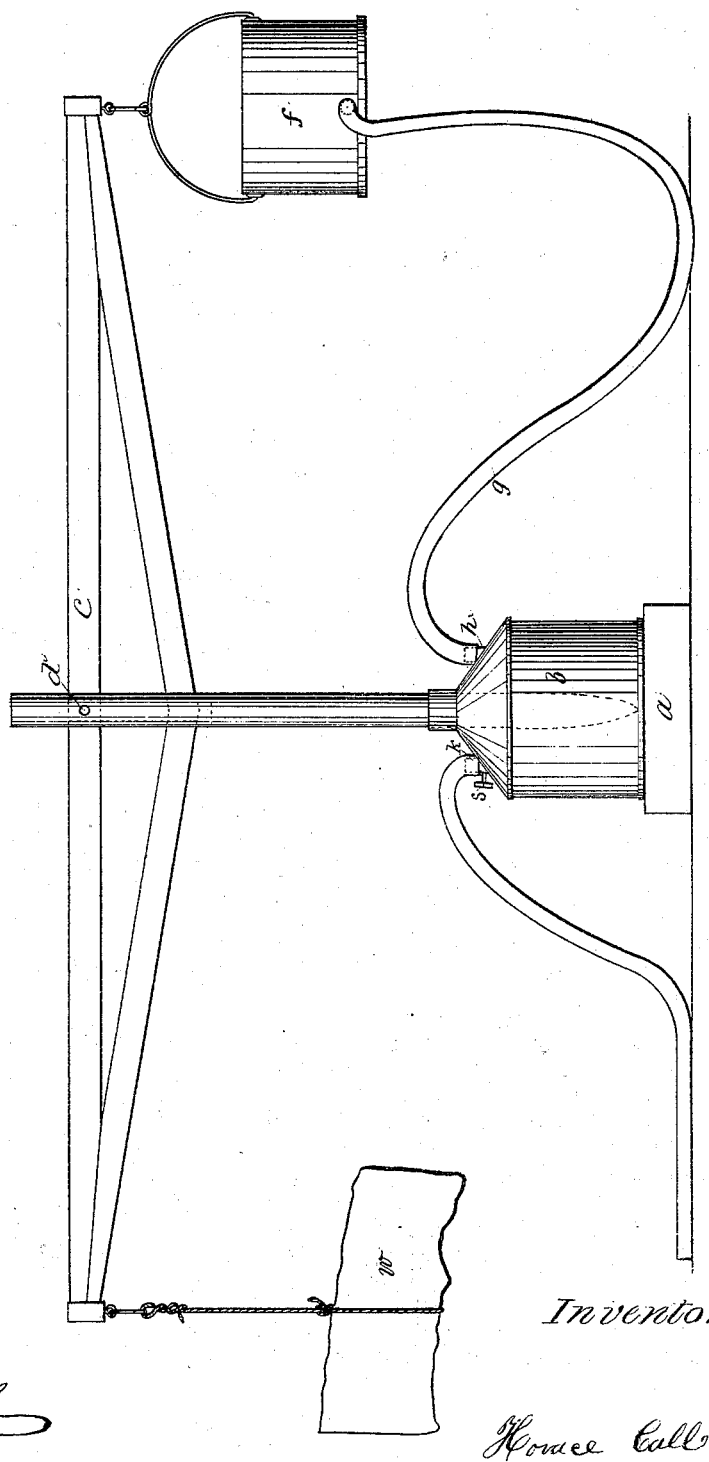

HORACE CALL, OF CONCORD, NEW HAMPSHIRE.

IMPROVEMENT IN DERRICKS.

Specification forming part of Letters Patent No. 151,089, dated May 19, 1874; application filed January 17, 1874.

*To all whom it may concern:*

Be it known that I, HORACE CALL, of Concord, in the county of Merrimack and State of New Hampshire, have invented a new and useful Apparatus for Lifting Weights; and I do hereby declare that the following is a full and accurate description thereof, reference being had to the accompanying drawings, and the letters of reference marked thereon.

At $a$ is shown a platform, which may be stationary or movable upon rollers, upon which rests a water-tank, $b$. From the center of this tank I erect the mast shown, which carries a balance-beam, $c$, working on the pivot $d$. At one end of this balance-beam I suspend another tank or receptacle, for holding water, $f$, and the other end of the balance-beam is provided with a hook and chains, for fastening to the weight to be raised, (represented at $w$ in the drawing.) The tank $b$ is filled with water, and from a point near the bottom of this tank a tube, $h$, is extended to the top, where a flexible tube, $g$, may be connected therewith, and extended to and entering the tank $f$ at or near the bottom thereof. The tank $b$ is made air-tight, and from the top thereof a tube, $k$, extends, which may be connected with an air-pump. The weight $w$ to be moved being attached as shown, then, by means of the pump, air is forced into the tank $b$, driving the water contained therein through the flexible tube $g$ into the tank $f$ at the opposite end of the balance-beam; and when water enough enters the tank $f$ to more than counterbalance the weight $w$, then it is plain that the weight will be lifted. The mast rests upon a pivot at the bottom, and may be turned round like the mast of an ordinary derrick, and the load thus may be swung into place; then, by opening a stop-cock, $s$, the air is permitted to escape from the tank $b$, and the water from the tank $f$ will flow back into the tank $b$, and the weight $w$ be lowered to its place. The water in the tank $b$ may thus be used again and again, so that a single tank full will suffice to operate the machine for a long time. When water may be conveniently obtained from water-works or other sources abundantly it may be permitted to flow directly into the tank $f$ to raise the weight, and when the weight is to be lowered the water may be wasted from the tank directly on the ground through the tude $g$, disconnected from the tank $b$, and provided with a stop-cock for the purpose. As the load is lifted by the weight of the tank of water on the opposite end of the balance-beam it will be seen that no guys are needed, as to the ordinary derrick, because there will be no strain tending to overturn the machine, and the whole apparatus may be completely under the control of one man.

The water from the tank $b$ may be pumped into the tank $f$ by an ordinary force-pump, and permitted to flow back again to lower the weight; but the work may be most conveniently done by means of an air-pump.

I claim as my invention, and desire to secure by Letters Patent—

A machine for lifting weights, having the mast $r$, balance-beam $c$, and tank $f$, with the flexible tube $g$, and tank $b$, or their equivalents, combined and operating substantially as and for the purposes set forth.

HORACE CALL.

Witnesses:
   CHAS. C. LUND,
   EDWARD DOW.